United States Patent [19]

Nicholson

[11] E Re. 30,943

[45] Reissued May 25, 1982

[54] STABILIZED MIXTURE

[75] Inventor: John P. Nicholson, Toledo, Ohio

[73] Assignee: Nicholson Realty Ltd., Sylvania, Ohio

[21] Appl. No.: 68,412

[22] Filed: Aug. 21, 1979

Related U.S. Patent Documents

Reissue of:

[64] Patent No.: 4,101,332
Issued: Jul. 18, 1978
Appl. No.: 765,837
Filed: Feb. 4, 1977

U.S. Applications:

[62] Division of Ser. No. 654,211, Feb. 2, 1976, Pat. No. 4,018,617.

[51] Int. Cl.[3] ..... C04B 7/26

[52] U.S. Cl. ..... 106/85; 106/97; 106/118; 106/DIG. 1

[58] Field of Search ..... 106/85, 97, 118, DIG. 1

[56] References Cited

U.S. PATENT DOCUMENTS

| | | | |
|---|---|---|---|
| 2,564,690 | 8/1951 | Havelin et al. | 106/DIG. 1 |
| 3,669,701 | 6/1972 | Biederman | 106/85 |
| 3,852,084 | 12/1974 | Webster et al. | 106/85 |

*Primary Examiner*—James Poer
*Attorney, Agent, or Firm*—Barnes, Kisselle, Raisch & Choate

[57] ABSTRACT

A mixture consisting essentially of fly ash and cement kiln dust which reacts at ambient temperature with water to produce a durable mass.

8 Claims, 4 Drawing Figures

ENERGY REQUIREMENTS
(24 FT. PAVEMENT)
INCLUDES MATERIALS, PRODUCTION
HAULING & PLACING.

* BTU FOR STEEL ONLY - NO HAULING OR PLACING

STABILIZED MIXTURE

Matter enclosed in heavy brackets [ ] appears in the original patent but forms no part of this reissue specification; matter printed in italics indicates the additions made by reissue.

This application is a division of application Ser. No. 654,211, filed Feb. 2, 1976, now U.S. Pat. No. 4,018,617.

This invention relates to materials which are capable of supporting surfacing such as pavement bases.

BACKGROUND OF THE INVENTION

In road paving, at one time it was thought that the base for the surfacing material should comprise a granular or gravel base. However, more recently, it has been concluded that there was a considerable difference in the performance between such bases and cement-aggregate or bituminous (asphalt)-aggregate bases. As reported in the Highway Research Board Special Report 61E, titled The AASHO Road Test, Report 5, Pavement Research, publication 954 of National Academy of Sciences-National Research Council, there is a clear superiority of such treated bases over untreated bases. In recent years, treated bases have become commonly known as stabilized bases.

In subsequent work, for example, use of asphalt mixtures in all courses of pavement above the subgrade has been proposed, The Asphalt Institute, Information Series No. 146, June 1968. Asphalt stabilized bases have become the most dominant stabilized base utilized to support a flexible surfacing such as asphalt concrete. In addition, asphalt concrete has found extensive use as a resurfacing material for concrete pavement.

It has also been proposed that a lime-fly ash-aggregate stabilized base be used in road paving. Such a base consists of a mixture of proper quantities of lime, fly ash, and graded aggregate at optimum moisture content, in which the stability is greatly enhanced by the cementing action which results from complex chemical reactions between the lime and the fly ash in the presence of water.

Stabilized bases are usually employed as base courses under wearing surfaces such as hot mixed, hot laid asphaltic concrete. A wearing surface is necessary to resist the high shearing stresses which are caused by traction, but the stabilized base provides the required stability to support wheel loads.

A serious obstacle to the expanded use of stabilized bases is the high energy costs for making the materials.

For example, it is well known that the production of portland cement which is used in stabilizing bases requires substantial quantities of coal in manufacture. In fact, the United States Department of Transportation has suggested that fly ash be substituted for a portion of the portland cement utilized in concrete or cement-aggregate bases, Federal Highway Administration Notice N5080.4, Jan. 17, 1974.

The use of asphalt in asphalt-aggregate bases which is derived from petroleum processing not only utilizes petroleum which is in short supply but also requires high energy to produce them.

Similarly, the lime, fly ash and graded aggregate stabilized bases utilize lime which requires coal in production. Such bases have been used in limited geographical areas of the United States where they can compete economically because of availability of lime and fly ash.

Thus, the predominantly used stabilized bases utilize materials that are in short supply and require substantial quantities of energy to produce them. The materials may be termed energy intensive. There is a need to avoid or minimize the use of such energy intensive materials in road paving.

Accordingly, among the objects of the invention are to provide a mixture of materials for producing a stabilized base comprising a hard, strong, durable mass capable of supporting surfacing which avoids or minimizes the use of materials which are energy intensive and, moreover, utilizes materials that normally are waste materials that are readily available.

SUMMARY OF THE INVENTION

In accordance with the invention, the mixture consists essentially of fly ash and cement kiln dust which reacts at ambient temperature with water to produce a durable mass.

DESCRIPTION

Figure 1:
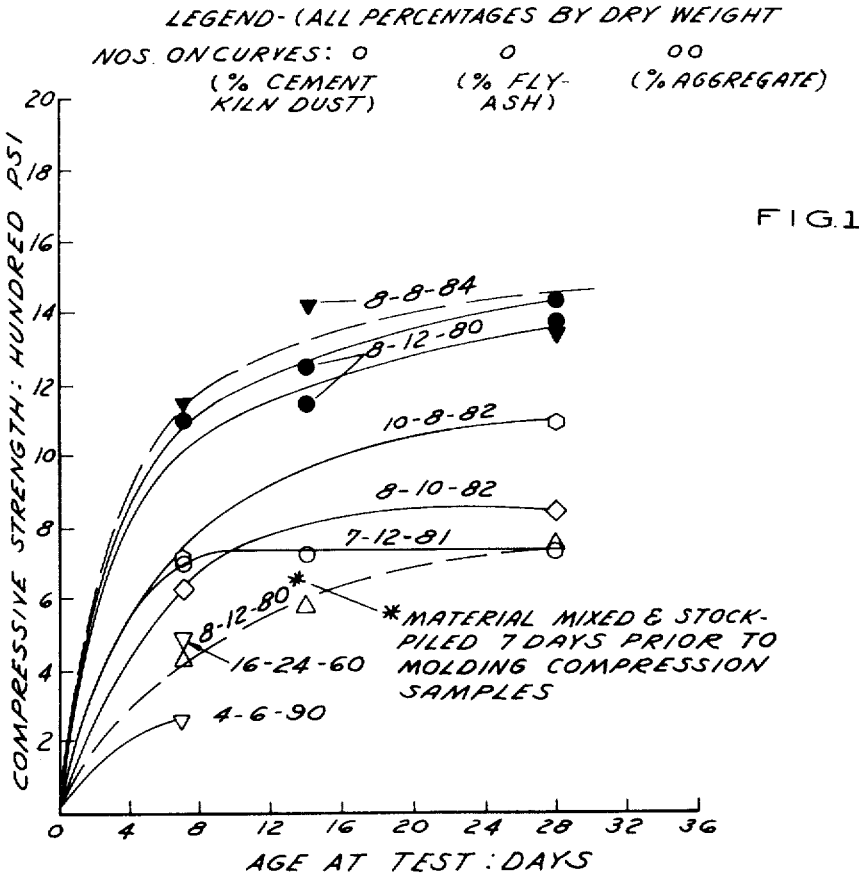
FIGS. 1–3 are curves of compressive strength versus age at test for various compositions.

In accordance with the invention, the pozzolanic load supporting composition utilizes cement kiln dust.

The solid waste generated by cement manufacture is primarily kiln dust. This dust contains a mixture of raw kiln feed, partly calcined material, finely divided cement klinker and alkali sulfates (usually sulfates). There is economic value in returning the dust to the kiln, but when the alkali content of the returned dust is too high for the product klinker to meet specifications, the dust must be discarded. Up to about 15% of the raw materials processed may be collected as dust and of this about half may be low enough in alkalis to be returned to the kiln. The rest is usually stockpiled as a waste material which must be disposed and may be a nuisance and possibly a hazard.

Although the chemical reactions occurring in the resultant cement kiln dust are not well known, typical cement kiln dust has a chemical analysis as follows:

$SiO_2$
$Al_2O_3$
$Fe_2O_3$
CaO
MgO
$SO_3$
$Na_2O$
$K_2O$
Loss Ignition

More specifically, typical cement kiln dust may have the following analyses:

| Ingredient | Source A | Source B | Source C | Source D | Source E | Source F | Source G | Source H | Source I | Mid-Range |
|---|---|---|---|---|---|---|---|---|---|---|
| $SiO_2$ | 28.5% | 6.0% | 22.4% | 11.2% | 13.0% | 23.5% | 14.8% | 14.6% | 14.7% | 17.2% |
| $Al_2O_3$ | 9.6 | 3.4 | 4.71 | 3.2 | 4.0 | 3.77 | 3.4 | 3.4 | 3.7 | 6.4 |
| $Fe_2O_3$ | 5.9 | 0.8 | 1.77 | 1.4 | 5.0 | 1.71 | 2.2 | 2.2 | 3.0 | 3.4 |
| CaO | 50.1 | 16.0 | 65.0 | 48.8 | 47.2 | 61.3 | 47.3 | 46.3 | 46.5 | 40.5 |
| MgO | 3.4 | 0.8 | 2.60 | 2.1 | 1.2 | 4.83 | 2.1 | 2.0 | 2.0 | 2.8 |
| $SO_3$ | 26.3 | 0.7 | 1.12 | 2.4 | 13.6 | 1.48 | 4.8 | 5.0 | 8.2 | 13.5 |
| $Na_2O$ | 3.18 | 0.08 | 0.24 | 0.2 | 0.45 | 0.24 | 0.9 | 0.9 | 0.8 | 1.6 |
| $K_2O$ | 26.23 | 1.08 | 1.3 | 4.2 | 2.9 | 1.85 | 4.1 | 5.1 | 3.0 | 13.7 |
| Loss on Ignition | 32.0% | 7.7% | 2.50% | 26.6% | 12.9% | 1.84% | 21.1% | 21.4% | 18.2% | 17.2% |

| Ingredient | RANGE Low % | High % | Average % |
|---|---|---|---|
| $SiO_2$ | 6.0 | 28.5 | 16.5 |
| $Al_2O_3$ | 3.2 | 9.6 | 4.35 |
| $Fe_2O_3$ | 0.8 | 5.9 | 2.66 |
| CaO | 16.0 | 65.0 | 47.6 |
| MgO | 0.8 | 4.83 | 2.34 |
| $SO_3$ | 0.7 | 26.3 | 7.07 |
| $Na_2O$ | 0.08 | 3.18 | 0.78 |
| $K_2O$ | 1.08 | 26.23 | 5.52 |
| Loss on Ignition | 2.50 | 32.0 | 16.0 |

When mixtures made in accordance with the invention and mixed with water to produce a pozzolanic reaction have been tested in accordance with the specifications given in ASTM C-593 for fly ash and other pozzolans for use with lime, it has been found that the compositions meet or exceed the specifications.

The term "fly ash" as used in connection with stabilized bases is well known and as used herein is intended to indicate the finely divided ash residue produced by the combustion of pulverized coal or lignite, which ash is carried off with the gases exhausted from the furnace in which the coal is burned and which is collected from these gases usually by means of suitable precipitation apparatus such as electrical precipitators. Those finely pulverized ashes resulting from combustion of oil and from combustion of waste materials in a large incinerator or natural pozzolans can also be utilized in the methods described herein providing their chemical compositions are reasonably similar to pulverized coal fly ashes. The fly ash so obtained is in a finely divided state such that usually at least 70% by weight passes through a 200-mesh sieve, although incinerator ashes may be considerably coarser. Fly ash may be considered an "artificial pozzolan", as distinguished from a "natural pozzolan".

The term "aggregate" as used in connection with load supporting compositions is also well known and refers to natural or artificial inorganic materials most of which are substantially chemically inert with respect to fly ash and lime, and substantially insoluble in water. Typically, aggregate may comprise limestone, sand, blast furnace slag, gravel, synthetic aggregate and other similar material.

Aggregates can comprise a wide range of types and gradations, including sands, gravels, crushed stones, and several types of slag. Aggregates should be of such gradation that, when mixed with cement kiln dust, fly ash and water, the resulting mixture is mechanically stable under compaction equipment and capable of being compacted in the field to high density. The aggregate should be free from deleterious organic or chemical substances which may interfere with the desired chemical reaction between the cement kiln dust, fly ash and water. Further, the aggregate should preferably consist of hard, durable particles, free from soft or disintegrated pieces.

It has been found that a preferable mixture comprises:

| | Percent by Dry Weight |
|---|---|
| Cement Kiln Dust | 8.0% |
| Fly Ash | 12.0% |
| Aggregate | 80.0% |
| Total | 100.0% |

However, the mixture for use in road stabilizer bases may preferably vary as follows:

| | Percent By Dry Weight |
|---|---|
| Cement Kiln Dust | 4–16% |
| Fly Ash | 6–24% |
| Aggregate | 60–90% |

As indicated above, tests were conducted in accordance with ASTM C-593. More specifically, the test specimens were molded using a mechanical compactor, having a 10 pound hammer with an 18 inch drop. The material was placed in the molds in three equal layers, and compacted by 25 blows per layer. The machine has a revolving turntable to evenly distribute the blows over the surface of the layer being compacted.

After molding, the samples were carefully removed from the molds, weighed, and sealed in plastic bag, labeled for identification, and placed in a constant temperature oven at 100° F. to cure until tested. Two cylinders of each mix were marked for testing at 7, 14 and 28 days of curing. After removal from the oven, the samples are submerged in water for four hours, removed, and allowed to drain on a non-absorbant surface, capped, and tested within one hour after removal from the water. The capping compound used is "Hydro-Stone" a lime based, quick-hardening compound. Plate glass was used to obtain even, parallel caps on the test specimens.

Examples of various tests and compositions are as follows:

EXAMPLE I

| | Percent | Weight of Batch |
|---|---|---|
| Cement Kiln Dust | 8.0% | 2.4# |
| Fly Ash | 12.0% | 3.6# |
| Limestone | 80.0% | 24.0# |
| Total | 100.0% | 30.0# |

| Specimen No. | Percent Water | Wt. As Molded (Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| A | 10.8 | 4.73 | 141.9 | 128.1 | 12.57 | 10-16 | 13,140 | 1050 |
| B | 10.8 | 4.72 | 141.6 | 127.8 | 12.57 | 10-16 | 14,370 | 1140 |
| C | 10.8 | 4.73 | 141.9 | 128.1 | 12.57 | 10-23 | 15,780 | 1260 |
| D | 10.8 | 4.73 | 141.9 | 128.1 | 12.57 | 10-23 | 15,530 | 1240 |
| E | 10.8 | 4.73 | 141.9 | 128.1 | 12.57 | 11-06 | 17,800 | 1420 |
| F | 10.8 | 4.73 | 141.9 | 128.1 | 12.57 | 11-06 | 17,800 | 1420 |

Remarks:
Slight bleeding at bottom of mold.

EXAMPLE II

| | Percent | Weight of Batch |
|---|---|---|
| Cement Kiln Dust | 8.0% | 2.4# |
| Fly Ash | 12.0% | 3.6# |
| Limestone | 80.0% | 24.0# |
| Retarder | — | 0.96 oz |
| Total | 100.0% | 30.0# |

| Specimen No. | Percent Water | Wt. As Molded (Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| A | 10.1 | 4.73 | 141.9 | 128.9 | 12.57 | 10-16 | — | — |
| B | 10.1 | 4.73 | 141.9 | 128.9 | 12.57 | 10-16 | — | — |
| C | 10.2 | 4.73 | 141.9 | 128.8 | 12.57 | 10-23 | 1,650 | 130 |
| D | 10.2 | 4.73 | 141.9 | 128.8 | 12.57 | 10-23 | 1,930 | 150 |
| E | 10.3 | 4.73 | 141.9 | 128.6 | 12.57 | 11-06 | 2,300 | 180 |
| F | 10.3 | 4.73 | 141.9 | 128.6 | 12.57 | 11-06 | 2,100 | 170 |

Remarks:
Slight bleeding.
Samples 2-A and 2-B fell apart during the four (4) hour soaking. There was no intact sample to subject to the compression test.
Samples C, D, E, and F were not subjected to the four (4) hour soaking, prior to testing.

EXAMPLE III

| | Percent | Weight of Batch |
|---|---|---|
| Cement Kiln Dust | 8.0% | 2.4# |
| Fly Ash | 12.0% | 3.6# |
| Limestone | 80.0% | 24.0# |
| Calcium Chloride Solution | — | (0.24#) |
| Total | 100.0% | 30.0# |

| Specimen No. | Percent Water | Wt. As Molded (Lbs.) | Wet Wt. Per Cu. Ft. | Dry Wt. Per Cu. Ft. | Area (Sq. in.) | Date Tested | Mach. Load | P.S.I. |
|---|---|---|---|---|---|---|---|---|
| A | 10.4 | 4.77 | 143.1 | 129.6 | 12.57 | 10-16 | 15,160 | 1210 |
| B | 10.4 | 4.77 | 143.1 | 129.6 | 12.57 | 10-16 | 15,750 | 1250 |
| C | 10.0 | 4.73 | 141.9 | 129.0 | 12.57 | 10-23 | 17,250 | 1370 |
| D | 9.9 | 4.73 | 141.9 | 129.1 | 12.57 | 10-23 | 18,950 | 1510 |
| E | 9.8 | 4.73 | 141.9 | 129.2 | 12.57 | 11-06 | 20,600 | 1640 |
| F | 9.7 | 4.72 | 141.6 | 129.1 | 12.57 | 11-06 | 20,700 | 1650 |

Remarks:
Slight bleeding

EXAMPLE IV

| | Percent | Weight of Batch |
|---|---|---|
| Cement Kiln Dust | 8.0% | 2.4# |
| Stack Dust | 3.0% | 0.9# |
| Fly Ash | 12.0% | 3.6# |
| Limestone | 77.0% | 23.1# |
| Total | 100.0% | 30.0# |

| Specimen No. | Percent Water | Wt. As Molded (Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| A | 8.5 | 4.53 | 135.9 | 125.3 | 12.57 | 10-17 | 8,200 | 652 |
| B | 8.5 | 4.54 | 136.2 | 125.5 | 12.57 | 10-17 | 8,900 | 708 |
| C | 8.7 | 4.58 | 137.4 | 126.4 | 12.57 | 10-24 | 10,950 | 871 |
| D | 8.8 | 4.56 | 136.8 | 125.7 | 12.57 | 10-24 | 11,775 | 937 |

EXAMPLE IV-continued

| | | | | | | | | |
|---|---|---|---|---|---|---|---|---|
| E | 9.0 | 4.58 | 137.4 | 126.1 | 12.57 | 11-07 | 16,050 | 1280 |
| F | 9.0 | 4.56 | 136.8 | 125.5 | 12.57 | 11-07 | 14,850 | 1180 |

Remarks:
No bleeding.

EXAMPLE V

| | Percent | Weight of Batch |
|---|---|---|
| Cement Kiln Dust | 12.0% | 3.6# |
| Fly Ash | 88.0% | 26.4# |
| Total | 100.0% | 30.0# |

| Specimen No. | Percent Water | Wt. As Molded (Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| A | 9.5 | 2.87 | 86.1 | 78.6 | 12.57 | 10-17 | 2,350 | 187 |
| B | 9.7 | 2.90 | 87.0 | 79.3 | 12.57 | 10-17 | 2,300 | 183 |
| C | 9.7 | 2.90 | 87.0 | 79.3 | 12.57 | 10-24 | 2,075 | 165 |
| D | 9.7 | 2.90 | 87.0 | 79.3 | 12.57 | 10-24 | 1,900 | 151 |
| E | 9.7 | 2.90 | 87.0 | 79.3 | 12.57 | 11-07 | 3,040 | 240 |
| F | 10.0 | 2.96 | 88.8 | 80.7 | 12.57 | 11-07 | 3,230 | 260 |

Remarks:
Had difficulty in reaching the desired moisture content because of the dust's extremely dry condition. Extremely "fluffy" material.

EXAMPLE VI

| | Percent | Weight of Batch |
|---|---|---|
| Cement Kiln Dust | 8.0% | 2.4# |
| Fly Ash | 8.0% | 2.4# |
| Limestone | 79.0% | 23.7# |
| Limestone Fines | 5.0% | 1.5# |
| Total | 100.0% | 30.0# |

Water added: 1158 + 136 = 1294

| Specimen No. | Percent Water | Wt. As Molded (Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| A | 9.8 | 4.85 | 145.5 | 132.5 | 12.57 | 10-20 | 13,900 | 1110 |
| B | 9.8 | 4.81 | 144.3 | 131.4 | 12.57 | 10-20 | 15,000 | 1190 |
| C | 9.8 | 4.79 | 143.7 | 130.9 | 12.57 | 10-27 | 17,350 | 1380 |
| D | 9.9 | 4.81 | 144.3 | 131.3 | 12.57 | 10-27 | 18,200 | 1448 |
| E | 9.9 | 4.81 | 144.3 | 131.3 | 12.57 | 11-10 | 17,050 | 1356 |
| F | 9.9 | 4.78 | 143.4 | 130.5 | 12.57 | 11-10 | 16,600 | 1321 |

Remarks:
Good compactability. Material was relatively easy to work with.

EXAMPLE VII

| | Percent | Weight of Batch |
|---|---|---|
| Fly Ash | 8.0% | 2.40# |
| Kiln Dust | 10.0% | 3.00# |
| No. 304 Limestone (Screened over ¾" screen) | 82.0% | 24.60# |
| Total | 100.0% | 30.00# |

| Cyl. No. | Percent Water | Wt. As Molded(Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| 1 | 11.5 | 4.73 | 141.9 | 127.3 | 12.57 | 4-01 | 9350 | 745 |
| 2 | 11.1 | 4.71 | 141.3 | 127.2 | 12.57 | 4-01 | 8610 | 685 |
| 3 | 11.1 | 4.73 | 141.9 | 127.7 | 12.57 | 4-01 | 9290 | 740 |
| 4 | 11.1 | 4.74 | 142.2 | 128.1 | 12.57 | 4-22 | 14050 | 1120 |
| 5 | 11.0 | 4.75 | 142.5 | 128.4 | 12.57 | 4-22 | 13500 | 1075 |
| 6 | 10.7 | 4.74 | 142.2 | 128.5 | 12.57 | 4-22 | 13620 | 1085 |

A. Slight bleeding at bottom of mold during compaction.
B. Material appeared deficient in limestone fines (-#4 material).
C. Some free moisture noted, giving slight "glossy" appearance.
D. Samples slumped, following extraction from molds.

EXAMPLE VIII

| | Percent | Weight of Batch |
|---|---|---|
| Fly Ash | 10.0% | 3.00# |
| Kiln Dust | 8.0% | 2.40# |
| No. 304 Limestone (Screened over ¾" screen) | 82.0% | 24.60# |

EXAMPLE VIII-continued

| | | Total | | 100.0 | | | 30.00# | |
|---|---|---|---|---|---|---|---|---|
| Cyl. No. | Percent Water | Wt. As Molded (Lbs.) | Wet Wt. Per Cu. Ft. | Dry Wt. Per Cu. Ft. | Area (Sq. In.) | Date Tested | Mach. Load | P.S.I. |
| 1 | 9.3 | 4.72 | 141.6 | 129.6 | 12.57 | 4-01 | 8060 | 640 |
| 2 | 9.4 | 4.71 | 141.3 | 129.2 | 12.57 | 4-01 | 7750 | 615 |
| 3 | 9.4 | 4.71 | 141.3 | 129.2 | 12.57 | 4-01 | 8000 | 635 |
| 4 | 9.5 | 4.69 | 140.7 | 128.5 | 12.57 | 4-22 | 9730 | 775 |
| 5 | 9.6 | 4.68 | 140.4 | 128.1 | 12.57 | 4-22 | 10450 | 830 |
| 6 | 9.5 | 4.69 | 140.7 | 128.5 | 12.57 | 4-22 | 11490 | 915 |

A. Samples retained shape following extraction from molds.
B. No free water noticed bleeding during compaction.

EXAMPLE IX

| | Percent | Weight of Batch |
|---|---|---|
| Fly Ash | 8.0% | 2.40# |
| Kiln Dust | 10.0% | 3.00# |
| Fill Sand | 82.0% | 24.60# |
| Total | 100.0% | 30.00# |

| Cyl. No. | Percent Water | Wt. As Molded (Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| 1 | 9.8 | 4.09 | 122.7 | 111.7 | 12.57 | 3-31 | 1800 | 145 |
| 2 | 10.0 | 4.12 | 123.6 | 112.4 | 12.57 | 3-31 | 1700 | 135 |
| 3 | 9.9 | 4.10 | 123.0 | 111.9 | 12.57 | 3-31 | 1690 | 135 |
| 4 | 9.9 | 4.11 | 123.3 | 112.2 | 12.57 | 4-21 | 2810 | 225 |
| 5 | 10.0 | 4.10 | 123.0 | 111.8 | 12.57 | 4-21 | 2880 | 230 |
| 6 | 9.8 | 4.09 | 122.7 | 111.7 | 12.57 | 4-21 | 2670 | 210 |

A. No bleeding of sample during compaction.
B. Material stayed in a ball when packed by hand.
C. Slight bulking noticed.
D. Easily compacted.

EXAMPLE X

| | Percent | Weight of Batch |
|---|---|---|
| Fly Ash | 8.0% | 2.40# |
| Kiln Dust | 10.0% | 3.00# |
| Glass (Crushed to approx. ½" size) | 32.0% | 9.60# |
| Fill Sand | 50.0% | 15.00# |
| Total | 100.0% | 30.00# |

| Cyl. No. | Percent Water | Wt. As Molded (Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| 1 | 9.4 | 4.50 | 135.0 | 123.4 | 12.57 | 4-02 | 4390 | 350 |
| 2 | 9.4 | 4.50 | 135.0 | 123.4 | 12.57 | 4-02 | 4590 | 365 |
| 3 | 9.3 | 4.51 | 135.3 | 123.8 | 12.57 | 4-02 | 4200 | 335 |
| 4 | 9.2 | 4.52 | 135.6 | 124.2 | 12.57 | 4-23 | 6750 | 535 |
| 5 | 9.1 | 4.51 | 135.3 | 124.0 | 12.57 | 4-23 | 6870 | 545 |
| 6 | 9.1 | 4.47 | 134.1 | 122.9 | 12.57 | 4-23 | 6280 | 500 |

A. Material originally mixed to 10.3% moisture, looked wet, probably because non-absorbancy of glass.
B. Air dried the mix out to approximately 9.4% moisture, did not bulk at this moisture content.
C. Surprisingly good cohesion of mix, even with the smooth faces of glass particles.
D. Strength of cylinders higher than expected, thought the mix would slip off the smooth glass faces, when put under compression.

EXAMPLE XI

| | Percent | Weight of Batch |
|---|---|---|
| Cement Kiln Dust | 16.0 | 3.2# |
| Fly Ash | 24.0 | 4.8# |
| No. 304 Crushed Limestone | 60.0 | 12.0# |
| Total | 100.0 | 20.0# |

| Specimen No. | Percent Water | Wt. As Molded (Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| A | 16.6 | 4.50 | 135.0 | 115.8 | 12.57 | 12/22 | 5890 | 470 |
| B | 15.1 | 4.46 | 133.8 | 116.2 | 12.57 | 12/22 | 6000 | 480 |
| C | 15.0 | 4.46 | 133.8 | 116.3 | 12.57 | 12/22 | 6150 | 490 |

EXAMPLE XII

| | Percent | Weight of Batch |
|---|---|---|
| Cement Kiln Dust | 4.0 | 0.8# |
| Fly Ash | 6.0 | 1.2# |
| No. 304 Crushed Limestone | 90.0 | 18.0# |
| Total | 100.0 | 20.0# |

| Specimen No. | Percent Water | Wt. As Molded (Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| A | 11.1 | 4.94 | 148.2 | 133.4 | 12.57 | 12/22 | 2950 | 230 |
| B | 11.2 | 4.93 | 147.9 | 133.0 | 12.57 | 12/22 | 3570 | 280 |
| C | 11.2 | 4.93 | 147.9 | 133.0 | 12.57 | 12/22 | 3250 | 260 |

EXAMPLE XIII

| | Percent | Weight of Batch |
|---|---|---|
| Cement Kiln Dust | 6.9% | 140# |
| Fly Ash | 11.8% | 240# |
| Limestone Screenings | 39.4% | 800# |
| No. 57 Crushed Limestone | 39.4% | 800# |
| Water | 2.5% | 50# |
| Total | 100.0% | 2030# |

| Specimen No. | Percent Water | Wt. As Molded (Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| A | 5.6 | 4.49 | 134.7 | 127.6 | 12.57 | 11-22 | 8,950 | 712 |
| B | 5.1 | 4.51 | 135.3 | 128.7 | 12.57 | 11-22 | 8,225 | 654 |
| C | 5.5 | 4.51 | 135.3 | 128.2 | 12.57 | 11-22 | 9,050 | 720 |
| D | 5.4 | 4.50 | 135.0 | 128.1 | 12.57 | 11-29 | 9,610 | 760 |
| E | 5.5 | 4.49 | 134.7 | 127.7 | 12.57 | 11-29 | 8,080 | 640 |
| F | 4.9 | 4.50 | 135.0 | 128.7 | 12.57 | 11-29 | 9,630 | 770 |
| G | 5.1 | 4.46 | 133.8 | 127.3 | 12.57 | 12-13 | 8,820 | 700 |
| H | 5.3 | 4.51 | 135.3 | 128.5 | 12.57 | 12-13 | 9,380 | 750 |
| I | 5.4 | 4.50 | 135.0 | 128.1 | 12.57 | 12-13 | 9,400 | 750 |
| J | 5.3 | 4.46 | 133.8 | 127.1 | 12.57 | 02-03 | | |
| K | 5.1 | 4.51 | 135.3 | 128.7 | 12.57 | 02-03 | | |
| L | 4.9 | 4.48 | 134.4 | 128.1 | 12.57 | 02-03 | | |
| M | 5.0 | 4.54 | 136.2 | 129.7 | 12.57 | For Durablilty Test | | |
| N | 4.9 | 4.54 | 136.2 | 129.8 | 12.57 | For Durability Test | | |
| O | 4.8 | 4.47 | 134.1 | 128.0 | 12.57 | For Durability Test | | |

EXAMPLE XIV

| | Percent | Weight of Batch |
|---|---|---|
| Cement Type I | 1.0% | 20# |
| Cement Kiln Dust | 6.8% | 140# |
| Fly Ash | 11.7% | 240# |
| Limestone Screenings | 39.0% | 800# |
| No. 57 Crushed Limestone | 39.0% | 800# |
| Water | 2.5% | 50# |
| Total | 100.0% | 1050# |

| Specimen No. | Percent Water | Wt. As Molded (Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| A | 5.4 | 4.58 | 137.4 | 130.4 | 12.57 | 11-21 | 10,030 | 800 |
| B | 5.4 | 4.58 | 137.4 | 130.4 | 12.57 | 11-21 | 11,780 | 940 |
| C | 5.4 | 4.58 | 137.4 | 130.4 | 12.57 | 11-21 | 14,120 | 1120 |
| D | 5.3 | 4.58 | 137.4 | 130.5 | 12.57 | 11-28 | 15,500 | 1230 |
| E | 5.0 | 4.58 | 137.4 | 130.9 | 12.57 | 11-28 | 18,500 | 1470 |
| F | 5.8 | 4.46 | 133.8 | 126.5 | 12.57 | 11-29 | 14,910 | 1190 |
| G | 5.8 | 4.46 | 133.8 | 126.5 | 12.57 | 12-13 | 17,900 | 1420 |
| H | 5.7 | 4.46 | 133.8 | 126.6 | 12.57 | 12-13 | 20,010 | 1590 |
| I | 5.7 | 4.46 | 133.8 | 126.6 | 12.57 | 12-13 | 14,980 | 1190 |
| J | 5.7 | 4.46 | 133.8 | 126.6 | 12.57 | 02-13 | | |
| K | 5.6 | 4.46 | 133.8 | 126.7 | 12.57 | 02-13 | | |
| L | 5.6 | 4.46 | 133.8 | 126.7 | 12.57 | 02-13 | | |
| M | 5.4 | 4.49 | 134.7 | 127.8 | 12.57 | For Durability Test | | |
| N | 5.4 | 4.49 | 134.7 | 127.8 | 12.57 | For Durability Test | | |
| O | 5.4 | 4.49 | 134.7 | 127.8 | 12.57 | For Durability Test | | |

EXAMPLE XV

| | Percent | Weight of Batch |
|---|---|---|
| Cement Kiln Dust | 7.8% | 160# |

EXAMPLE XV-continued

| | | |
|---|---|---|
| Fly Ash | 11.7% | 240# |
| Limestone Screenings | 39.0% | 800# |
| No. 57 Crushed Limestone | 39.0% | 800# |
| Water | 2.5% | 50# |
| Total | 100.0% | 2050# |

| Specimen No. | Percent Water | Wt. As Molded(Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| A | 8.1 | 4.24 | 127.2 | 117.7 | 12.57 | 11-22 | 4,650 | 370* |
| B | 7.9 | 4.24 | 127.2 | 117.9 | 12.57 | 11-22 | 5,700 | 450 |
| C | 8.3 | 4.29 | 128.7 | 118.8 | 12.57 | 11-22 | 6,030 | |
| D | 7.8 | 4.25 | 127.5 | 118.3 | 12.57 | 11-29 | 7,200 | 570 |
| E | 7.7 | 4.24 | 127.2 | 118.1 | 12.57 | 11-29 | 6,850 | 540 |
| F | 7.6 | 4.26 | 127.8 | 118.8 | 12.57 | 11-29 | 8,080 | 640 |
| G | 7.6 | 4.30 | 129.0 | 119.9 | 12.57 | 12-13 | 10,000 | 800 |
| H | 7.6 | 4.27 | 128.1 | 119.0 | 12.57 | 12-13 | 9,500 | 760 |
| I | 7.6 | 4.27 | 128.1 | 119.0 | 12.57 | 12-13 | 8,980 | 710 |
| J | 7.5 | 4.27 | 128.1 | 119.2 | 12.57 | 02-13 | | |
| K | 7.3 | 4.28 | 128.4 | 119.7 | 12.57 | 02-13 | | |
| L | 7.2 | 4.26 | 127.8 | 119.2 | 12.57 | 02-13 | | |
| M | 7.2 | 4.27 | 128.1 | 119.5 | 12.57 | For Durability Test | | |
| N | 7.1 | 4.24 | 127.2 | 118.8 | 12.57 | For Durability Test | | |
| O | 7.2 | 4.25 | 127.5 | 118.9 | 12.57 | For Durability Test | | |

*Sample fractured horizontally during capping

Remarks:

This product was produced on November 6, and sampled on November 13. Materials are the same as in Example XIII - This example is a check to see if the age of the product, before use, has any effect on the strength results.

EXAMPLE XVI

| | Percent | Weight of Batch |
|---|---|---|
| Fly Ash | 11.6% | 232# |
| Lime | 3.4% | 68# |
| No. 304 Crushed Limestone | 85.0% | 1700# |
| Water | — | — |
| Total | 100.0% | 2000# |

| Specimen No. | Percent Water | Wt. As Molded(Lbs.) | Wet Wt. Per Cu. Ft. | Dry Wt. Per Cu. Ft. | Area (Sq. In.) | Date Tested | Mach. Load | P.S.I. |
|---|---|---|---|---|---|---|---|---|
| A | 10.4 | 4.60 | 138.0 | 125.0 | 12.57 | 11-28 | 10,325 | 820 |
| B | 10.4 | 4.70 | 141.0 | 127.7 | 12.57 | 11-28 | 11,950 | 950 |
| C | 10.2 | 4.62 | 138.6 | 125.8 | 12.57 | 11-28 | 10,650 | 850 |
| D | 10.2 | 4.67 | 140.1 | 127.1 | 12.57 | 12-05 | 19,600 | 1559 |
| E | 10.2 | 4.66 | 139.8 | 126.9 | 12.57 | 12-05 | 18,950 | 1508 |
| F | 11.1 | 4.65 | 139.5 | 125.6 | 12.57 | 12-05 | 19,825 | 1577 |
| G | 10.8 | 4.66 | 139.8 | 126.2 | 12.57 | 12-19 | 21,860 | 1740 |
| H | 10.8 | 4.66 | 139.8 | 126.2 | 12.57 | 12-19 | 20,790 | 1650 |
| I | 10.8 | 4.64 | 139.2 | 125.6 | 12.57 | 12-19 | 21,000 | 1670 |
| J | 10.8 | 4.70 | 141.0 | 127.3 | 12.57 | 02-19 | | |
| K | 10.9 | 4.65 | 139.5 | 125.8 | 12.57 | 02-19 | | |
| L | 10.9 | 4.68 | 140.4 | 126.6 | 12.57 | 02-19 | | |
| M | 10.9 | 4.66 | 139.8 | 126.1 | 12.57 | For Durability Test | | |
| N | 10.9 | 4.68 | 140.4 | 126.6 | 12.57 | For Durability Test | | |
| O | 9.6 | 4.63 | 138.9 | 126.7 | 12.57 | For Durability Test | | |

Figure 2:
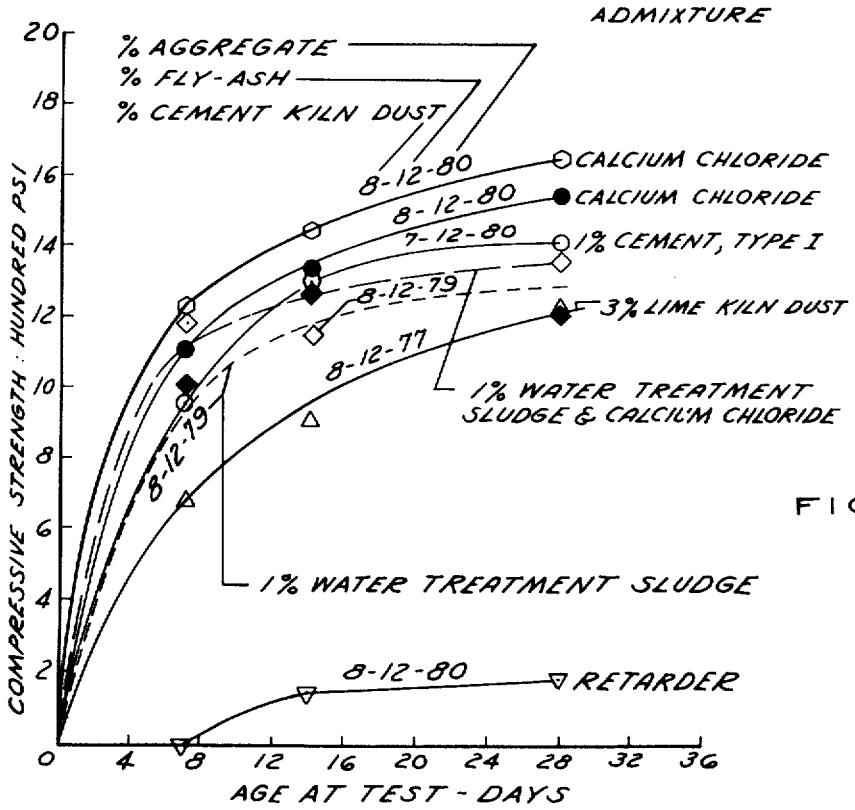
Figure 3:
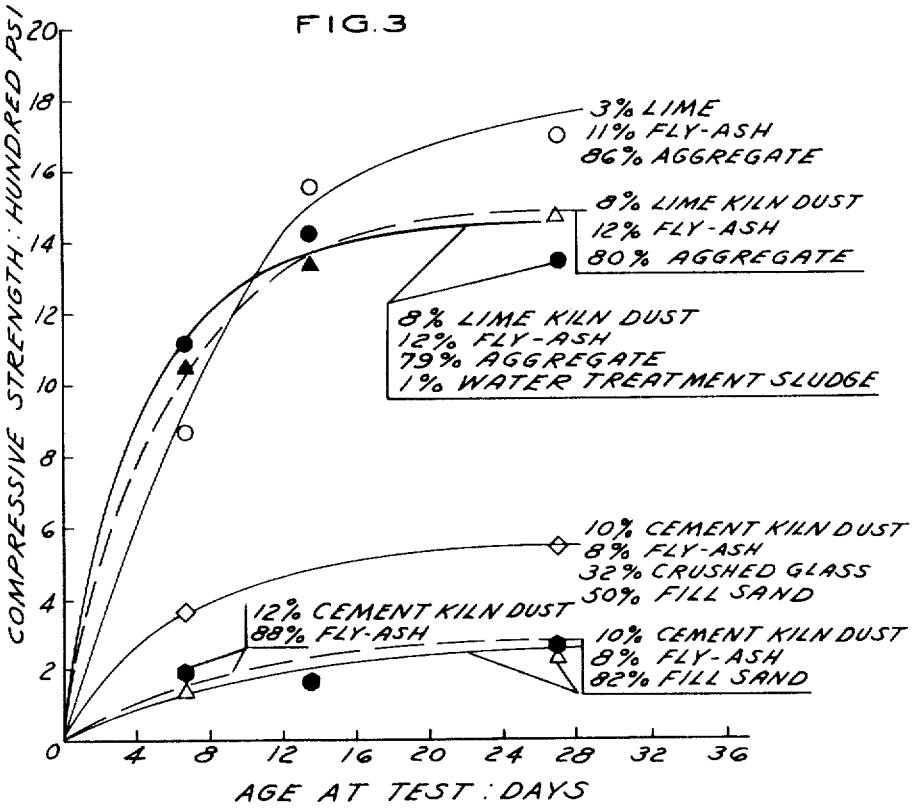

The results of the tests are summarized in FIGS. 1-3.

As shown in FIG. 1, mixtures containing cement kiln dust vary but in each instant produce a base that is stabilized.

As shown in FIG. 2, the addition of additives or admixtures generally do not affect the strength except that a retarder tends to prevent the early development of strength as might be expected.

As shown in FIG. 3, the strength of mixtures including cement kiln dust compare favorably with a lime, fly ash, aggregate mixture. In addition, even a mixture of cement kiln dust and fly ash produces a stabilized base.

Thus, the mixtures of the present invention result in a stabilized base that is comparable in strength and required performance characteristics to cement-aggregate or lime-fly ash-aggregate stabilized bases and yet are not energy intensive. The mixtures of the present invention cost less than the predominantly used asphalt-aggregate bases. Also, the use of mixtures of the invention releases asphalt for use in resurfacing or as a heavy industrial fuel.

Figure 4:
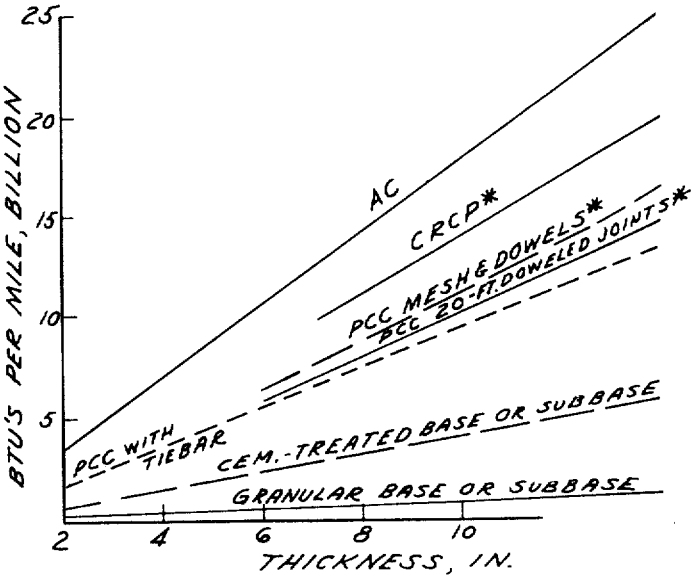
FIG. 4 is curves of energy requirements for various pavement materials.

FIG. 4 is a curve showing the BTU's per mile versus thickness for various road paving materials taken from Highway Research Circular titled "Fuel Usage Factors for Highway Construction", Number 158, July, 1974. It ca be seen that asphalt concrete and cement type mixtures require substantial energy and only granular base or sub-base of aggregate has minimal energy requirements in hauling, spreading, compacting and finishing. Since the mixtures of the present invention utilize waste materials, namely, cement kiln dust and fly ash, the energy requirements for making a stabilized base are only in hauling, spreading, compacting and finishing.

As a result, the mixtures of the present invention have minimal energy requirements and thereby obviate the energy intensive materials or prior stabilized bases.

The mixtures of the present invention utilize cement kiln dust which is a waste product that is relatively available from cement plants and fly ash which is readily available from power plants.

I claim:

1. A mixture consisting essentially of fly ash and cement kiln dust.

2. The mixture set forth in claim 1 including an amount of portland cement.

3. The mixture set forth in claim 1 wherein said cement kiln dust comprises about 12% by dry weight and said fly ash comprises about 88% by dry weight.

4. The method which comprises mixing fly ash, cement kiln dust and water and permitting the mixture to react at ambient temperatures to produce a durable mass.

5. The method set forth in claim 4 wherein said [fly ash] *cement kiln dust* comprises about 12% by dry weight of the total of fly ash and cement kiln dust and the [cement kiln dust] *fly ash* comprises about 88% by dry weight of the total of fly ash and cement kiln dust.

6. The mixture set forth in claim 1 including about 1% portland cement.

7. The mixture set forth in claim 1 wherein the fly ash comprises the major constituent.

8. The method set forth in claim 4 including mixing about 1% portland cement with said fly ash and cement kiln dust.

* * * * *